United States Patent [19]

Hahn et al.

[11] Patent Number: 4,525,484
[45] Date of Patent: Jun. 25, 1985

[54] PARTICULATE POLYSTYRENE CONTAINING BLOWING AGENT AND HAVING IMPROVED EXPANDABILITY

[75] Inventors: Klaus Hahn, Kirchheim; Paul Wittmer, Landau; Isidoor De Grave, Wachenheim; Rupert Schick, Limburgerhof; Adolf Echte, Ludwigshafen, all of Fed. Rep. of Germany

[73] Assignee: BASF Aktiengesellschaft, Fed. Rep. of Germany

[21] Appl. No.: 623,197

[22] Filed: Jun. 21, 1984

Related U.S. Application Data

[62] Division of Ser. No. 531,658, Sep. 13, 1983.

[30] Foreign Application Priority Data

Sep. 18, 1982 [DE] Fed. Rep. of Germany ....... 3234660

[51] Int. Cl.³ .............................. C08J 9/18; C08J 9/20
[52] U.S. Cl. ........................................ 521/56; 521/60; 521/146
[58] Field of Search ................................... 521/56, 60

[56] References Cited

U.S. PATENT DOCUMENTS 4,086,191 4/1978 Hinselmann et al. .
4,228,244 10/1980 Rigler et al. .

FOREIGN PATENT DOCUMENTS 1094315 12/1967 United Kingdom .
1249506 10/1971 United Kingdom .

Primary Examiner—Morton Foelak
Attorney, Agent, or Firm—Keil & Weinkauf

[57] ABSTRACT

Particulate polystyrene containing blowing agent and having improved expandability is based on polystyrene having a weight-average mean molecular weight of not more than from 130,000 to 180,000 and a molecular weight distribution curve in which the high molecular weight flank drops steeply. The expandable polystyrene particles are produced by polymerizing styrene in aqueous suspension in the presence of blowing agents and of chain transfer agents or styrene oligomers.

1 Claim, 1 Drawing Figure

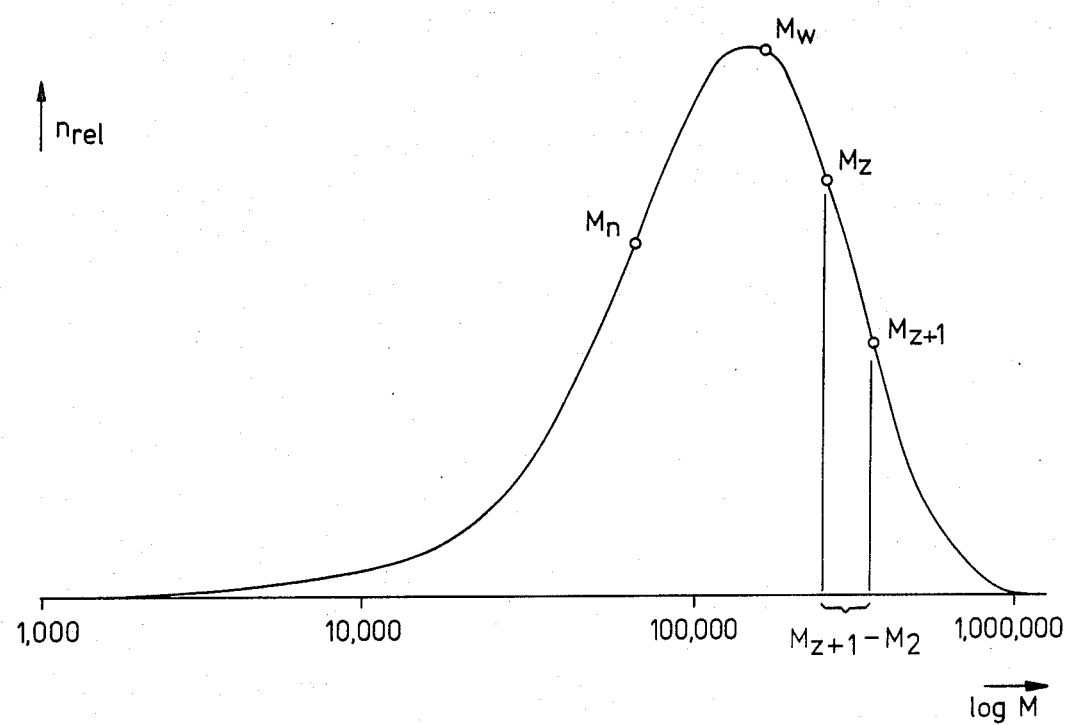

PARTICULATE POLYSTYRENE CONTAINING BLOWING AGENT AND HAVING IMPROVED EXPANDABILITY

This is a division of application Ser. No. 531,658, filed Sept. 13, 1983.

The present invention relates to polystyrene, containing blowing agent and having improved expandability, the polystyrene having a characteristic molecular weight distribution, and to processes for its preparation and use.

In the preparation of polystyrene foams, foamable polymer particles containing blowing agent are heated at above their softening point until they have foamed to a loose mass having the desired bulk density. This process is described as prefoaming.

It is desirable that the polymer particles containing blowing agent should be very rapidly foamable, i.e. that low densities should be attainable at high throughputs. The expandability of the polymer particles can be improved by conventional low molecular weight plasticizers, but these have the disadvantage that when the prefoamed particles are finally foamed to give foam moldings, the plasticizers adversely affect the dimensional stability of the moldings.

According to British Pat. No. 1,249,506 the expandability of styrene/acrylonitrile copolymer particles can be improved by lowering the molecular weight through use of chain transfer agents, for example iodine or dodecyl mercaptan. In the Examples, the chain transfer agent is added at the start of the suspension polymerization in which the polymer particles are produced. A similar process is described in Examples 8 and 9 of British Pat. No. 1,094,315. We have found that this process results in a polymer which has a very high residual monomer content, shrinks greatly on foaming and therefore cannot be converted to useful moldings.

It is an object of the present invention to improve the expandability of particulate polystyrene, containing blowing agent, so that it can be foamed to give low densities at high throughputs, without adversely affecting the dimensional stability of foam moldings produced from the particles.

We have found that this object is achieved by the particulate polystyrene, containing blowing agent, according to the present invention.

The polystyrene particles according to the invention, containing blowing agent, differ from those of the prior art in respect of their molecular weight and their molecular weight distribution. The molecular weight is determined by gel permeation chromatography. This method is described in detail in G. Glöckler, Polymercharakterisierung, Chromatographische Methoden, volume 17, published by Hüthig, Heidelberg 1982. According to the invention, the polystyrene has a weight-average mean molecular weight $M_w$ of from 130,000 to 180,000, preferably from 140,000 to 175,000, and especially from 142,000 to 172,000. It is moreover characterized by its molecular weight distribution, in which the high molecular weight flank of the molecular weight distribution curve must be so steep that the difference between the mean values $(M_{Z+1}-M_Z)$ is less than $150 \cdot 10^3$, preferably less than $130 \cdot 10^3$ and especially less than $120 \cdot 10^3$. The said mean values are described and defined in H. G. Elias, Makromoleküle, published by Hüthig, 1971, pages 52 and 64. The FIGURE shows a typical molecular weight distribution curve obtained by GPC measurements, in which the relative frequency $n_{rel}$ of the polymer chains of a particular molecular weight is plotted against the molecular weight. $M_w$ is the weight average and $M_n$ the number average; $M_Z$ and $M_{Z+1}$ are further average values which can be calculated as described by Elias and lie on the high molecular weight flank of the curve. Their difference $(M_{Z+1}-M_Z)$ is a measure of the steepness of this part of the curve.

The polystyrene particles contain one or more homogeneously dispersed blowing agents. Examples of suitable blowing agents are hydrocarbons and halohydrocarbons which are gaseous or liquid under normal conditions, do not dissolve the styrene polymer, and boil below the softening point of the polymer, for instance propane, butane, pentane, cyclopentane, hexane, cyclohexane, dichlorodifluoromethane and trifluorochloromethane. The blowing agents are in general contained in the polystyrene particles in amounts of from 3 to 12% by weight, preferably from 5 to 8% by weight, based on the polystyrene.

The polystyrene particles can also contain other additives which impart particular properties to the expandable products. Examples include flameproofing agents based on organic bromine or chlorine compounds, e.g. trisdibromopropyl phosphate, hexabromocyclododecane and chloroparaffin as well as synergists for flameproofing agents, such as dicumyl peroxides and other organic peroxides which decompose at high temperatures, antistatic agents, stabilizers, colorants, lubricants, fillers, substances which prevent agglomeration during prefoaming, e.g. zinc stearate, melamine-formaldehyde condensates or silica, and agents for reducing the demolding time during final foaming, e.g. glycerol esters or hydroxycarboxylic acid esters. Depending on their intended effect, the additives may be homogeneously dispersed in the particles or be present as a surface coating.

According to a preferred process, the novel polystyrene particles containing blowing agent are prepared by polymerization of styrene in aqueous suspension, the blowing agents described above being added before, during or after the polymerization. From 0.01 to 0.5% by weight, preferably from 0.05 to 0.3% by weight, of a bromine-free organic compound having a chain transfer constant K of from 0.1 to 50 is added during the polymerization, at a styrene conversion of from 20 to 90%.

It is known that chain transfer agents or regulators lower the molecular weight of styrene polymers. This is made use of in the preparation of polystyrene having improved flow by adding from 0.01 to 0.05% by weight of a regulator, e.g. dodecyl mercaptan, to the polymerization batch. With expandable polystyrene, this simple method is unsuccessful: if the chain transfer agent is added even before the polymerization, the resulting polystyrene particles containing blowing agent shrink greatly after expansion and on sintering give foam moldings having poor dimensional stability.

U.S. Pat. No. 4,086,191 proposes that in the preparation of polystyrene particles containing blowing agent, bromine compounds be added towards the end of the suspension polymerization. These compounds have the effect that on foaming expanded polystyrene particles having an edge zone with very fine cell structure are formed. Some of these bromine compounds also act as regulators. If the said bromine compounds are added before the styrene polymerization has reached 90% conversion, the foaming gives expanded particles having a fine cell structure throughout, and these particles give foam moldings which have very inadequate dimensional stability and a great tendency to collapse.

U.S. Pat. No. 4,228,244 describes finely particulate expandable styrene polymers which contain from 0.00005 to 0.01% of organic bromine compounds, for example hexabromobut-2-ene. The addition of the bromine compounds to the polymerization results in the formation of fine-celled foams with low minimum mold residence times. The patent states that the use of the bromine compounds, in the claimed low concentrations, does not have a discernible effect on the molecular weight of the polystyrene. Moreover, it has been found that if higher concentrations are used, though the molecular weight and molecular weight distribution can then be influenced in a controlled manner, foams having an extremely fine cell structure are produced, which exhibit poor dimensional stability and unsatisfactory thermal conductivity.

The suspension polymerization of styrene is known per se and is described in detail in Kunststoff-Handbuch, volume V "Polystyrol", published by Carl Hanser, pages 679 to 688. In this method, styrene is suspended in water, conventional organic or inorganic suspension stabilizers being added, preferably in amounts of from 0.05 to 2% by weight, based on the suspension. The polymerization is in general carried out at from 80° to 130° C., preferably from 100° to 120° C. To start the polymerization, organic polymerization initiators, e.g. peroxides or azo compounds, which are thermally decomposed into free radicals, are used, in amounts of from 0.01 to 1% by weight, based on the monomers.

The chain transfer agents are added to the polymerization batch at a conversion of from 20 to 90%, preferably from 40 to 60%. Conversion here means the percentage proportion of polymerized monomers, based on total monomers employed. It can be measured, for example, by stopping the polymerization after a certain time, for example by adding inhibitors, and measuring the amount of unpolymerized monomers.

Chain transfer agents having a transfer constant K (as defined in Vollmert, Grundriss der Makromolekularen Chemie, published by Springer 1962, pages 52 and 71) of from 0.1 to 50, preferably from 1 to 30, are used. Examples of suitable compounds are:

| | |
|---|---|
| n-Dodecyl mercaptan | (K = 19) |
| tert.-Dodecyl mercaptan | (K = 3) |
| n-Butyl mercaptan | (K = 22) |
| tert.-Butyl mercaptan | (K = 3.6) |
| Carbon tetrabromide | (K = 2.2) |
| Pentaphenylethane | (K = 2.0) |

According to another preferred process, the novel polystyrene particles containing blowing agent are prepared by polymerizing styrene in the presence of blowing agents, from 0.1 to 10% by weight of a styrene oligomer being added at a conversion of from 0 to 90%.

Styrene oligomers are known and may be prepared, for example, by continuous thermal polymerization of styrene under superatmospheric pressure. Their number-average mean molecular weight is from 500 to 5,000, preferably from 800 to 2,000.

The novel polystyrene particles containing blowing agent in general have a diameter of from 0.2 to 4 mm. They can be prefoamed by conventional methods, for example with steam, to give foam particles having a diameter of from 0.5 to 2 cm and a density of from 5 to 100 g.$l^{-1}$. We have found that the achievable throughput is substantially increased by the addition of chain transfer agent or styrene oligomer.

The prefoamed particles can then be finally foamed by conventional methods to give foam moldings having densities of from 5 to 100 g.$l^{-1}$.

The addition of chain transfer agents or styrene oligomers influences the molecular weight and molecular weight distribution of the polymers formed, and hence also their rheological properties, which in turn affect the expandability of the polystyrene particles containing blowing agent, and the dimensional stability of foam moldings prepared therefrom. For example, a lowering of the elastic viscosity results in better expandability and a lowering of the reversible elongation for a given elastic viscosity leads to better dimensional stability. Both properties can be measured directly on the styrene polymer particles containing blowing agent by a method described in "Prüfung hochpolymerer Werkstoffe", published by Carl Hanser, Vienna, 1977, page 422.

The polystyrene particles are melted by heating to 155° C. and are devolatilized for 5 minutes, during which time the blowing agent evaporates. A polymer strand 20 mm long and 5 mm in diameter is prepared by extrusion. The sample is clamped in a tensometer located in silicone oil at 150° C. It is then stretched to a length of 300 mm under a tensile stress of $2.10^4$ Pa. The elastic viscosity $\mu$ is the ratio of the tensile force to the rate of elongation. After the tensile stress is released, the sample shrinks again. The reversible elongation $E_r$ is the natural logarithm of the ratio of the starting length of the sample to the length of the sample after shrinkage.

The novel polystyrene particles containing blowing agent have, when measured by the method described above, an elastic viscosity of less than $4.2 \times 10^6$ [Pas], preferably of from 1.5 to $3.0 \times 10^6$ [Pas], and a reversible elongation of less than 0.95, preferably of from 0.6 to 0.9.

In the Example, parts and percentages are by weight.

EXAMPLE

A. Polymerization

A mixture of 150 parts of water, 0.1 part of sodium pyrophosphate, 100 parts of styrene, 7 parts of n-pentane, 0.45 part of benzoyl peroxide and 0.15 part of t-butyl perbenzoate (as polymerization initiators) was heated, with stirring, to 90° C. in a stainless steel pressure-resistant stirred kettle.

After 2 hours at 90° C., 4 parts of a 10% strength aqueous solution of polyvinylpyrrolidone were added.

The mixture was then stirred for a further 2 hours at 90° C., thereafter for 2 hours at 100° C. and finally for 2 hours at 120° C. The chain transfer agents or styrene oligomers were introduced into the stirred kettle after the conversions shown in the Table had been reached. The granules obtained, having a mean particle diameter of 1.5 mm, were isolated and dried.

B. Coating 100 parts of the expandable polystyrene granules, consisting of a fraction of bead size from 1.0 to 2.3 mm diameter were coated with 0.4 part of glycerol monostearate by tumbling for 3 minutes in a paddle mixer.

C. Processing

The coated expanded polystyrene beads were pre-foamed to a bulk density of 15 g/l±0.1 g/l in a Rauscher continuous stirred prefoamer, using a stream of steam, and the throughput in kg/h was determined.

The products were then stored for 24 hours after which they were welded in a Rauscher block mold, by steaming for 20 seconds under a pressure of 1.8 bar, to produce a block.

The shrinkage values shown were calculated from the difference between the internal dimensions of the mold at room temperature and the dimensions of the foam block after it had cooled to room temperature and been left for about 24 hours. The shrinkage is given in percent based on the internal dimensions of the mold. The results are summarized in the Table.

D. Molecular weight measurement

The mean molecular weights and the molecular weight distribution were determined by the GPC method. For this, a column combination was assembled which ensured best possible separation both in the low molecular weight and high molecular weight range.

The column combination consisted of 5 columns connected in series. Each had a length L of 300 mm and an internal diameter $D_i$ of 10 mm; the following types of silica were used:
1 × Si 60
1 × Si 100
1 × Si 300
2 × Si 1000

These packings are LiChrospher and LiChrosorb from Merck (silica gels) of particle size 10 μm (with the exception of Si 60, which is LiChrosorb).

The flow rate was 2.8 ml/min and the solvent for the polystyrene particles was tetrahydrofuran.

200 μl of an 0.5% strength solution were injected at room temperature. A differential refractometer from Knauer, Dual Detector Type 61.00, was fitted as the detector. To check that the flow rate was uniform, a drip counter was used.

To convert the measurements obtained to the molecular weight, a calibration curve was prepared in parallel, using 12 narrow-distribution polystyrene samples of known molecular weight, from Pressure Chemical Co.

To standardize the column combination used, a broad polystyrene sample No. 706, characterized by the National Bureau of Standards, was measured. This gave the following mean values of the molecular weight:
$M_n = 74,000$
$M_w = 243,000$
$M_z = 392,000$

TABLE

| Additive | — | t-DM | t-DM | t-DM | t-DM | n-DM | n-DM | Oligostyrene | |
|---|---|---|---|---|---|---|---|---|---|
| Transfer constant | — | 3 | 3 | 3 | 3 | 3 | 9 | — | — |
| Concentration % | — | 0.05 | 0.1 | 0.1 | 0.3 | 0.3 | 0.3 | 1 | 1.5 |
| Conversion % | — | 40 | 40 | 0 | 55 | 0 | 40 | 0 | 0 |
| Throughput kg/h | 110 | 130 | 160 | (1) | 220 | (1) | 150 | 140 | 190 |
| Shrinkage % | 1.9 | 1.6 | 1.8 | — | 2.0 | — | 2.1 | 1.6 | 2.0 |
| Elastic viscosity $10^6$ Pas | 5.5 | 2.2 | 3.4 | 0.8 | 2.6 | 0.6 | 4.1 | 2.7 | 2.6 |
| Reversible elongation | 1.08 | 0.83 | 0.89 | — | 0.72 | — | 0.88 | 0.87 | 0.71 |
| $M_n \cdot 10^3$ | 70 | 65 | 62 | 49 | 56 | 40 | — | 56 | 62 |
| $M_w \cdot 10^3$ | 221 | 164 | 156 | 108 | 134 | 95 | — | 168 | 166 |
| $M_{Z+1} - M_Z \cdot 10^3$ | 163 | 102 | 103 | — | 133 | — | — | 140 | 111 |

In the Table:
t-DM = tert-dodecyl mercaptan
n-DM = n-dodecyl mercaptan
Oligostyrene = a product of molecular weight 1 200
(1)These granules could not be converted to foams because they agglomerated excessively even at the prefoaming stage, because of their high monostyrene content (>1%).

We claim:
1. A particulate polystyrene containing blowing agent and having improved expandability, wherein the polystyrene has a weight-average mean molecular weight $M_w$, measured by gel permeation chromatography, of from 130,000 to 180,000, and the high molecular weight flank of the molecular weight distribution curve, the molecular weight being measured by the same method, is so steep that the difference between the mean values $(M_{Z+1} - M_Z)$ is less than $150 \times 10^3$.

* * * * *